Dec. 11, 1945.    E. J. HOUDRY ET AL    2,390,536

SEPARATION OF HYDROCARBON GASES

Filed July 7, 1942

INVENTOR
EUGENE J. HOUDRY
RICHARD W. BLUE
BY Ira L. Nickerson
ATTORNEY

Patented Dec. 11, 1945

2,390,536

UNITED STATES PATENT OFFICE 2,390,536

SEPARATION OF HYDROCARBON GASES

Eugene J. Houdry, Ardmore, and Richard W. Blue, Swarthmore, Pa., assignors to Houdry Process Corporation, Wilmington, Del., a corporation of Delaware Application July 7, 1942, Serial No. 450,014

4 Claims. (Cl. 183—114.2)

The present invention relates to processes for the separation of hydrocarbon gas mixtures containing at least two hydrocarbon gases one of which is more strongly adsorbed than the other. It has particular reference to the separation of mixtures of olefin and paraffin gases into two products, each of which products contains a high percentage of one of the two materials in the mixture.

Heretofore selective adsorbents have been employed in the purification of gases, as for instance in the purification of air containing quantities of noxious gases such as sulphur dioxide. In such instances the gas is fed to the adsorbent until the percentage of the adsorbed material commences to increase substantially in the purified gas, at which time the feed to the unit is stopped and the adsorbed material is then desorbed. Notwithstanding the fact that olefins are more strongly adsorbed than are the paraffins, we have found that processes of the indicated type are of no commercial interest for the separation of hydrocarbon gases. While a good paraffin product is obtainable when charging a mixture of olefin and paraffin, the concentration of olefin in the desorbed material is too low to be of real interest.

It is accordingly an object of the present invention to provide processes for the separation of mixtures of hydrocarbon gases from mixtures of a plurality of such gases by the use of solid adsorbents.

In accordance with the present invention the gas mixture is fed to the adsorbent and the effluent is withdrawn as a product of the less strongly adsorbed material until the percentage thereof in the effluent commences to drop substantially. Thereafter feed of the mixture to the unit is continued and the effluent is withdrawn separately from the product for retreatment, feeding being continued until the composition of the effluent gas approaches the composition of the feed, whereupon feeding is discontinued. The adsorbed gas is then desorbed. The gas which is initially desorbed and which is relatively high in the less strongly adsorbed material is withdrawn for retreatment. Following the initial desorption period the desorbed gas is then withdrawn separately as a product of high content of the more strongly adsorbed material.

Figure 1:
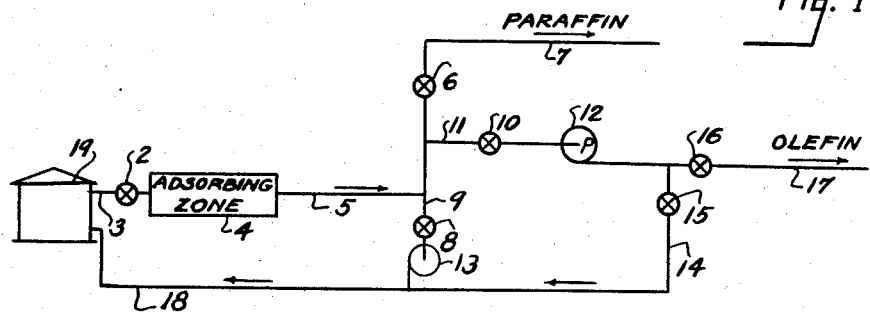
Figure 2:
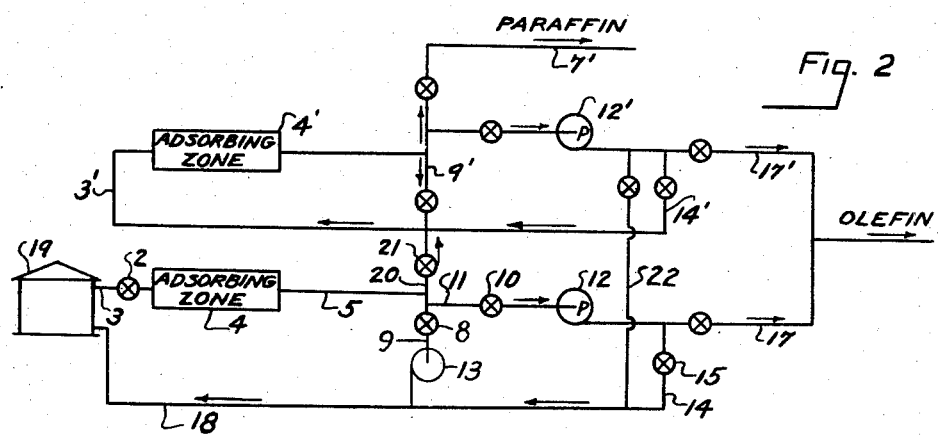

In the accompanying drawing Figs. 1 and 2 are flow sheets of treating systems in accordance with this invention.

The gas mixtures treated in accordance with the present invention may be obtained from any suitable source. Thus the hydrocarbon gases may be separated from natural gas or they may be refinery gas, either from cracking or a gas mixture derived by the dehydrogenation of a paraffin gas, for example, the dehydrogenation of butane or propane. While it is preferable that the gas consist predominately of hydrocarbons containing the same number of carbon atoms, mixtures may be treated containing, for example, both $C_3$ and $C_4$ hydrocarbons. The present process is of particular importance in the separation of mixtures consisting essentially of normal butane and normal butene.

In Fig. 1, operation of which is described in connection with the separation of a butane-butene mixture, the mixture is introduced into the system through line 3, provided with a valve 2, into an adsorbing zone 4. In this adsorbing zone, which in practice is a suitable pressure-tight receptacle provided with an indirect heat exchange system, there is provided any suitable solid surface adsorbent, such as silica gel, or the like. Following the desorption stage of the cycle, which is in general conducted under low pressure, the gas is fed to the zone 4 during an initial repressuring period. During this repressuring period, no gas leaves zone 4. Following repressuring, effluent gas is withdrawn from zone 4 through line 5. During this stage of the cycle the valve 6 in line 7 is open while the valves 8 and 10 in lines 9 and 11, respectively, are closed. Each of lines 7, 9 and 11 communicates with line 5. This period of the cycle is continued until the percentage of paraffin in the effluent gas commences to drop substantially. The length of this period is a function of the composition of the gas which is charged, the rate of feed, the length of path through the adsorbing zone 4, and the concentration of hydrocarbon which it is necessary to obtain in the product. In general, as pure a paraffin product as may be desired can be obtained by increasing the length of path through the zone. After this initial adsorption period, instead of shutting off the feed to zone 4, the feed is continued, but with valve 6 closed and valve 8 open. The pump 13 in the line 9 is started and returns the gas to gas holder 19 through the line 18. During this period of the cycle the paraffin content of the effluent gas drops from the high initial content to a composition approaching that of the feed.

The desorption period of the cycle is then instituted by the closing of the valves 2 and 8 and opening of valve 10. In order to effect desorption rapidly, the zone 4 is heated by the indirect heat exchange system therein, and vacuum pump 12 in line 11 is started. During the initial period of desorption a mixture is withdrawn which is only somewhat more concentrated in olefin than the gas mixture which was fed to zone 4. This mixture is withdrawn through line 14 which is provided with a valve 15. After the preliminary desorption period a highly concentrated olefin gas is produced, whereupon the valve 15 is closed and valve 16 in line 17 is opened.

The gas mixture, which passes from the adsorption zone during the final period of the adsorbing stage and initial period of the desorbing stage, is returned for retreatment through line 18 and may be passed either to a gas holder 19, from which gas is supplied to the system, or it may be admixed with the material in line 3.

While in Fig. 1 there has been shown a system involving only a single adsorbing zone 4, it is to be understood that in the application of the present invention to a commercial plant a plurality of adsorbing zones may be operated in parallel, each of which, at any given time, would be operating at a different stage of the cycle whereby the feed to the system may be continuous instead of intermittent, and whereby vacuum pump 12 may be in continuous operation.

The method of separating gases in this invention is applicable to a gas mixture of virtually any percentage composition. However, when it is desired to separate a mixture which is predominately paraffin or predominately olefin, if rigid specifications are to be met on composition of separated material which occurs in the small percentage, it is in many instances advantageous to employ the form shown in Fig. 2. The system of Fig. 2 is specially adapted to the treatment of mixtures containing a large proportion of olefin. The gas mixture is introduced through line 3 into zone 4 and the same cycle of operation is maintained as shown in Fig. 1. The initial gas through the adsorbing zone is withdrawn through line 20, provided with valve 21, and is introduced into a second system of the same character as shown in Fig. 1. This gas is very much more concentrated in paraffin than is the charge. The gas from zone 4, during the final period of the adsorption stage and during the initial period of the desorption stage, is recycled for retreatment in adsorbing zone 4. In the supplementary system shown in the upper portion of Fig. 2 the charge consists of the gas through line 20 together with the recycle gas from treatment thereof. The gas flows into zone 4' through line 3'. The highly concentrated paraffin gas from the initial period of the adsorption stage in zone 4' is withdrawn through line 7', while the gas from the final period of the adsorption stage is withdrawn through line 9'. Desorption is effected by vacuum pump 12', the initial desorbed material passing through line 14' to line 3' together with the gas mixture from line 9'. The highly concentrated olefin product obtained in the final stages of the desorption period is withdrawn through line 17' as product. Alternately, if greater purity is desired the olefin can be further purified by forwarding it through valved line 22 for retreatment in zone 4 together with the fresh feed. It is to be understood, of course, that an equally concentrated paraffin gas product could be obtained from the same feed by increasing the length of path in the adsorbing zone.

The following operations are illustrative of this invention:

A gas mixture containing 50% butane and 50% butene was fed to an adsorbing zone containing a commercial silica gel at a rate of 4.8 liters of gas per liter of silica gel per minute. The length of path in the adsorbing zone was 36". During the initial 7 minutes of feeding all the gas fed was adsorbed, there being none flowing from the adsorbing zone. During the next 4 minutes a product was withdrawn which contained 95% butane and 5% butene. Thereafter feed to the adsorbing zone was continued for another 4 minutes, during which time the material leaving the zone was collected separately. The temperature during the adsorbing stage started at about 70° F., increased during adsorption, and then toward the end of the adsorption period dropped to about 80°. Desorption was then initiated by heating the adsorbent and drawing a vacuum on the zone. During the first 6 minutes the withdrawn material was collected, together with that withdrawn during the final period of adsorption. During the ensuing 14 minutes a product consisting of 85% butene and 15% butane was withdrawn. The butane product constituted by weight 30% of the material charged. The butene-butane mixture for retreatment contained 63% of butene and was equal to 50% of the material charged. The butene product was equal to 20% of the material charged.

A mixture consisting of 80% butane and 20% butene was charged at the same rate to a zone of the same length of path. The repressuring period during which no material flowed from the adsorbing zone extended for 8 minutes. The next 10 minutes a butane product consisting of 95% butane and 5% butene was withdrawn and constituted 24% of the charged material. During the final 12 minutes of the adsorption period and initial 10 minutes of desorption period a recycle stock was withdrawn containing 21.5% butene, 78.5% butane, constituting 71% of the charge. During the final 10 minutes of desorption a butene product containing 70% butene and 30% butane was withdrawn and constituted 5% of the charge.

We claim as our invention:

1. The process of separating hydrocarbon mixtures of at least two hydrocarbon gases one of which is more strongly adsorbed than the other, comprising charging the mixture to an adsorbent contact material until the composition of effluent gas approaches the composition of charged mixture, withdrawing initial effluent gas as product, separately withdrawing and recycling gas thereafter leaving the adsorbent material during charging, discontinuing charging, effecting desorption, withdrawing and recycling initially desorbed mixture, and thereafter withdrawing desorbed gas as product.

2. The process of separating paraffin and olefin hydrocarbon gas mixtures to obtain two purified products, comprising charging the mixture to an adsorbent material, withdrawing as product the initial effluent material, which carries a high percentage of the paraffin, until the percent of paraffin contained in the effluent drops substantially, then continuing charging the mixture until the composition of the effluent approaches the composition of the charged mixture, withdrawing as mixture the effluent gas during this continued charging, effecting desorption of the adsorbed gas, withdrawing as mixture the initially desorbed gas until a highly concentrated olefin gas commences to be desorbed, withdrawing effluent gas thereafter desorbed separately from the initially desorbed gas, and retreating the gas mixtures withdrawn during charging and desorption.

3. The process of separating paraffin and olefin hydrocarbon gas mixtures to obtain two purified products, comprising charging the mixture to silica gel, withdrawing as product the initial effluent material, which carries a high percentage of the paraffin, until the percent of paraffin contained in the effluent drops substantially, then continuing charging the mixture until the composition of the effluent approaches the composition of the charged mixture, withdrawing as mixture the effluent gas during this continued charging, effecting desorption of the adsorbed gas, withdrawing as mixture the initially desorbed gas until a highly concentrated olefin gas commences to be desorbed, withdrawing effluent gas thereafter desorbed separate from the initially desorbed gas, and retreating the gas mixtures withdrawn during charging and desorption.

4. The process of separating a butane-butene mixture which comprises charging the mixture to a silica gel until the composition of the effluent gas approaches the composition of the charged mixture, withdrawing initial effluent gas as a high butane product, separately withdrawing and recycling gas thereafter leaving the adsorbent material, discontinuing charging, effecting desorption, withdrawing and recycling initially desorbed mixture, and therafter withdrawing desorbed gas as product butene.

RICHARD W. BLUE.
EUGENE J. HOUDRY.